United States Patent Office 3,498,804
Patented Mar. 3, 1970

3,498,804
CERAMIC GLAZE
Clarence M. Head, Jr., Decatur, Ga., assignor to Lockheed Aircraft Corporation, Burbank, Calif.
No Drawing. Filed Mar. 25, 1963, Ser. No. 267,829
Int. Cl. C03c 5/00, 5/02
U.S. Cl. 106—49                   1 Claim This invention relates to a ceramic glaze for refractory castables having a low coefficient of thermal expansion.

In recent years refractory castables, such as the fused silica refractory cements, have been developed which have an extremely low coefficient of thermal expansion (in the range of $0.5 \times 10^{-6}$ to $7.0 \times 10^{-6}/°$ F.). By reason of their low coefficient of thermal expansion, such refractory castables are adapted for use in a variety of applications and are particularly suited for use in heated molding dies for the molding of parts to close tolerance without concern for expansion or contraction of the die. Such refractory castables have the important limitations, however, of being quite porous and rough, thus preventing the molding of smooth surface parts. To alleviate these limitations, much research has been done in recent years toward the development of a smooth glaze coating having a coefficient of thermal expansion compatible with or comparable to that of the refractory castables having a low coefficient of thermal expansion in the range of $0.5 \times 10^{-6}$ to $7.0 \times 10^{-6}/°$ F.

This invention eliminates the disadvantages and limitations of such prior art refractory castables having a coefficient of thermal expansion by providing a smooth, abrasion resistant, and thermal shock resistant coating therefor, having a coefficient of thermal expansion compatible with that of refractory castables whereby transient temperature changes will not cause failure of the glaze coating. Moreover, the glaze matures at the same temperature as fired refractory castables, and therefore may be fired along with the refractory castable, thus eliminating the additional expense of two firing operations. Further, since the fused silica refractory cements revert to cristobalite above 2,400° F. and the strength of calcium aluminate refractory castables decreases excessively above that temperature, the maturing temperature of the glaze is maintained below 2,400° F., in the range of 1,800° F. to 2,400° F. The glaze also having good abrasion characteristics results in it having a long life.

Accordingly, it is an object of this invention to provide a ceramic glaze coating for refractory castables having an extremely low coefficient of thermal expansion.

Another object of this invention is to provide an abrasion resistant and thermal shock resistant ceramic coating having an extremely low coefficient of thermal expansion.

Still another object of this invention is to provide a ceramic glaze coating having an extremely low coefficient of thermal expansion which has a maturing temperature in the range of 1,800° F. to 2,400° F.

Other objects and advantages will become apparent from the following description.

Generally stated, this invention comprises a smooth, abrasion resistant, thermal shock resistant ceramic glaze coating having a low coefficient of thermal expansion particularly adapted for the coating of refractory castables having a low coefficient of thermal expansion.

Toward this end there is provided a ceramic glaze which, when compounded within the ranges listed in the below glaze formula and by following the procedures detailed hereinafter, yields a ceramic glaze meeting these criteria. The general properties of the glaze ingredients are listed in the glaze formula for convenience.

GLAZE FORMULA

| | Range (pbw.) | Properties of ingredient |
|---|---|---|
| PbO | 10–25 | Glass former and flux. |
| Alkalies ($K_2O$, $Li_2O$) | 0–8 | Flux and brilliance. |
| $Al_2O_3$ | 10–20 | Abrasion resistance, refractory qualities acid resistance, reduce crawling tendencies. |
| $B_2O_3$ | 7–20 | Glass former and flux, increases fluidity of glass. |
| $Cr_2O_3$ | 0–3.5 | Abrasion resistance, refractory qualities. |
| $SiO_2$ | 40–70 | Glass former, abrasion resistance, refractory qualities. |
| $ZrO_2$ | 0–10 | Reduces crazing, improves alkali resistance. |

In order to more fully illustrate the instant invention, the following examples are presented.

EXAMPLE 1

A standard frit composition was prepared by melting together for about one hour at about 2,400° F., a mixture of the following ingredients:

| | Parts by weight |
|---|---|
| Litharge | 18.0 |
| Potash spar | 20.1 |
| Boric acid | 13.2 |
| Silica | 18.6 |
| Lithium carbonate | 1.0 |
| Chrome oxide | 0.4 |
| Zircon | 5.6 |

The calculated composition of the resulting frit, expressed in weight percentages, was as follows:

| Component: | Weight percent |
|---|---|
| PbO | 29.8 |
| $K_2O$ | 2.8 |
| $Li_2O$ | 0.9 |
| $Al_2O_3$ | 3.1 |
| $B_2O_3$ | 12.6 |
| $Cr_2O_3$ | 0.6 |
| $SiO_2$ | 44.7 |
| $ZrO_2$ | 6.2 |

When complete intersolution was achieved, the frit was quenched in water. The quenched frit was then ground to minus 200 mesh, and a mill addition of potash feldspar (10.1 parts by weight), kaolin (7.4 parts by weight), spodumene (14.9 parts by weight), and $Cr_2O_3$ (1.0 part by weight) was made. A glaze slip was then made by adding 60 percent water by weight. The glaze was then applied to the commercially available fused silica refractory cement, known by the trade name of Glasrock, and fired at approximately 2,000° F. on an 8-hour schedule. The resultant glaze was smooth, glossy and of a deep green color due to the presence of the $Cr_2O_3$.

Using the same procedure as described in Example 1, other frit compositions and glazes were prepared by mixing various quantities of ingredients to produce frits having a variety of compositions; and ceramic glazes were prepared from such frit compositions falling within the ranges of this invention. The amounts of ingredients employed, the glaze compositions along with the smelting and firing temperature, and the observed qualities of the glazes are recorded below in Table I along with the data of Example 1.

TABLE 1.—OPERATING DATA OF GLAZE COMPOSITIONS

| Ingredients added | Parts by weight (examples) | | | |
|---|---|---|---|---|
| | 1 | 2 | 3 | 4 |
| Litharge | 18.0 | 19.4 | 18.3 | 17.3 |
| Potash spar | 30.2 | 17.6 | 16.6 | 15.7 |
| Boric acid | 13.2 | 14.0 | 13.2 | 12.5 |
| Silica | 18.6 | 20.0 | 18.8 | 17.9 |
| Chrome oxide | 1.4 | 0.4 | 0.4 | 0.4 |
| Lithium carbonate | 1.0 | 0.8 | 0.8 | 0.8 |
| Kaolin | 7.4 | 8.0 | 7.6 | 7.2 |
| Spodumene | 14.9 | 20.0 | 20.0 | 17.8 |
| Zircon | 5.6 | | 4.7 | 8.9 |

| Glaze composition | Weight percent (examples) | | | |
|---|---|---|---|---|
| | 1 | 2 | 3 | 4 |
| PbO | 19 | 21.2 | 20.0 | 19.8 |
| $K_2O$ | 3.5 | 3.3 | 3.1 | 3.1 |
| $Li_2O$ | 1.0 | 4.2 | 4.1 | 3.9 |
| $Al_2O_3$ | 11.5 | 12.7 | 12.1 | 10.0 |
| $B_2O_3$ | 10 | 8.5 | 7.6 | 8.4 |
| $Cr_2O_3$ | 0.5 | 0.4 | 0.4 | 0.4 |
| $SiO_2$ | 50 | 49.3 | 51.0 | 47.4 |
| $ZrO_2$ | 6.2 | | 3.4 | 6.9 |
| Smelting temp. (° F.) | 2,400 | 2,400 | 2,400 | 2,400 |
| Firing temp. (° F.) | 2,000 | 2,000 | 2,200 | 2,400 |

In each of the examples, the resulting glazes were smooth, glossy, abrasion resistant, thermal shock resistant and had good continuity. Although each of these glazes had good continuity, those of Examples 1, 3 and 4 were the most continuous and of these, the glaze of Example 4 was more continuous than the glaze of Example 3 due to the beneficial effects of their high $ZrO_2$ content.

Still another example of a glaze according to the present invention consists essentially of PbO in the amount of about 19%; alkaline metal oxide in the amount of about 5% and selected from the group consisting of $K_2O$, $Li_2O$ and mixtures thereof; $Al_2O_3$ in the amount of about 12%; $B_2O_3$ in the amount of about 9%; $SiO_2$ in the amount of about 49%; and $ZrO_2$ in the amount of about 6%; all percentages expressed on a weight basis.

An important characteristic of the ceramic glazes of this invention is their good abrasion resistance. The $Al_2O_3$, $Cr_2O_3$ and $ZrO_2$ give the glaze its abrasion resistance characteristics; and to assure that optimum abrasion resistance would be obtained, the ceramic glaze of Example 2 was tested to obtain an abrasion coefficient. Then the ingredients $ZrO_2$ and $Cr_2O_3$ were added to the Example 2 glaze in incremental amounts in parts by weight to determine their effect on the abrasion resistance of the test glaze. The glazes thus formed fall within the range contemplated by this invention; however, for convenience the weight percentages of their components have not been listed in Table 1. The abrasion tests were conducted on a power hack saw with silicon carbide 180 grid sand paper mounted on the saw blade as the abrasive media. A relative abrasion resistance coefficient for each sample was determined by the formula:

$$R = \frac{\text{Time (sec.) to make } 1\tfrac{1}{2}'' \text{ long cut through glaze sample}}{\text{Average glaze thickness (inches)} \times 1000}$$

The results were as follows:

(1) Example 2 alone (R=16)
(2) Example 2 glaze+5% $ZrO_2$ (R=20)
(3) Example 2 glaze+5% $ZrO_2$+1% $Cr_2O_3$ (R=20)
(4) Example 2 glaze+5% $ZrO_2$+2% $Cr_2O_3$ (R=21)
(5) Example 2 glaze+10% $ZrO_2$+2% $Cr_2O_3$ (R=26)

The results indicate tha the Example 2 glaze has good abrasion resistance characteristics, that the addition of $Cr_2O_3$ thereto in small percentages does not materially increase the abrasion resistance of the glaze, and that the addition of $ZrO_2$ in small percentages does materially enhance the abrasion resistance of the glaze. Accordingly, to obtain optimum abrasion resistance, it is preferred that the glaze of this invention be formulated with between 3% to 10% $ZrO_2$ by weight. If a clear glaze is desired, the $Cr_2O_3$, which gives the glaze a deep green color, may be eliminated without adversely affecting the abrasion resistance qualities of the glaze. Moreover, since the addition of $Cr_2O_3$ in small quantities to the glaze produces an excessive increase in the maturing temperature of the glaze, the quantity of $Cr_2O_3$ employed should be maintained quite small. The principal advantage obtained by the use of $Cr_2O_3$ in the glaze, when the glaze is applied to the white and off-white refractory cements, is that it makes possible the detection of faulty application and/or chipping of the glaze. Also, visual and microscopic examination of the glazes formed for the abrasion test disclosed that micro-crazing of the glaze decreased in direct proportion to the $ZrO_2$ added. These observations along with the observations of Examples 1, 3 and 4 indicate that to optimize continuity (minimize crazing), the most desirable amount of $ZrO_2$ included in the glaze formula to be within the range of 3% to 10% by weight.

Resistance to thermal shock is a very desirable attribute of the ceramic glazes of this invention. To assure that the glazes have good thermal shock resistance, thermal shock tests were conducted on the Example 1 glaze. A specimen was quenched from 2,000° F. to the smooth surface of a Dry Ice block (−110° F.) where it remained for ten minutes at which time it could be handled continuously. The specimen was then put into the furnace at 2,200° F. for ten minutes. This was more than sufficient time to raise the glazed surface temperature to 2,200° F., but not enough time to permit significant re-melting of the glaze. The specimen sustained 10 cycles before crazing became significant (hairline). Small glaze fragments broke from the specimen on the 13th cycle; and the area of glaze failure had reached 10% of the total area by the 16th cycle. These results compare quite favorably with norms established in the art wherein failure after one to two cycles indicates very poor thermal shock resistance, failure after five to seven cycles indicates very good thermal shock resistance, and failure after more than seven cycles indicates excellent thermal shock resistance.

From the above description and the examples presented, first compositions containing various constituents have been produced from which ceramic glazes for refractory cements have been prepared. These glazes are smooth, glossy, thermal shock resistant, abrasion resistant and have an extremely low coefficient of thermal expansion.

What is claimed is:
1. A ceramic glaze consisting essentially of
   PbO in amount of about 19 percent; alkali metal oxide selected from the group consisting of $K_2O$, $Li_2O$ and mixtures thereof, said alkali metal oxides being present in amount of about 5 percent; $Al_2O_3$ in amount of about 12 percent; $B_2O_3$ in amount of about 9 percent; $SiO_2$ in amount of about 49 percent; and $ZrO_2$ in amount of about 6 percent; all percentages expressed on a weight basis.

References Cited

UNITED STATES PATENTS

| 2,844,693 | 7/1958 | Rigterink | 106—49 |
| 2,969,293 | 1/1961 | Smith | 106—49 |
| 3,203,815 | 8/1965 | Michael | 106—49 |
| 3,228,548 | 1/1966 | Butler | 106—53 |

HELEN M. McCARTHY, Primary Examiner

U.S. Cl. X.R.

106—53